United States Patent [19]
Kofink et al.

[11] 3,986,665
[45] Oct. 19, 1976

[54] HEATING SYSTEM FOR VEHICLES HAVING AN INTERNAL COMBUSTION ENGINE

[75] Inventors: Siegfried Kofink, Zell, Wurttemberg; Fritz Reuter, Esslingen, both of Germany

[73] Assignee: J. Eberspacher, Esslingen, Neckar, Germany

[22] Filed: Feb. 28, 1975

[21] Appl. No.: 554,108

[52] U.S. Cl. .................. 237/12.3 A; 123/41.04; 126/400; 165/52; 165/104 S; 165/105
[51] Int. Cl.² ............................................. B60H 1/20
[58] Field of Search ................ 237/12.3 A, 44; 126/400; 165/52, 104, 105; 123/41.14

[56] References Cited
UNITED STATES PATENTS

| | | | |
|---|---|---|---|
| 1,997,003 | 4/1935 | Marquard | 237/12.3 A |
| 3,779,232 | 12/1973 | Schroder | 126/400 |
| 3,884,292 | 5/1975 | Pessolano et al. | 165/105 X |

*Primary Examiner*—William E. Wayner
*Assistant Examiner*—William E. Tapolcai, Jr.
*Attorney, Agent, or Firm*—Toren, McGeady and Stanger

[57] ABSTRACT

A heating system for a vehicle passenger compartment provides a heat reservoir wherein heat energy from the engine exhaust means may be stored until needed to heat the passenger compartment, for example, when the vehicle is operated with a cold running engine. The reservoir absorbs the heat from the engine exhaust pipe through absorption means which may include sodium as a heat transmission medium and which operate to limit the heat transfer between the exhaust system and the reservoir to levels of exhaust gas temperature above a predetermined minimum. A vacuum chamber surrounding the heat reservoir may have a heat transfer fluid, such as freon, introduced therein to transmit the stored heat to air which is to be supplied to the vehicle passenger compartment.

15 Claims, 2 Drawing Figures

HEATING SYSTEM FOR VEHICLES HAVING AN INTERNAL COMBUSTION ENGINE

BACKGROUND OF THE INVENTION

The present invention relates generally to a heating system for vehicles having an internal combustion engine and more particularly to a heating system comprising means for introducing heated air into the interior of the vehicle.

Various types of heating systems for heating vehicle passenger compartments are known, and in some cases such heating systems have the capability of heating the vehicle interior independently of the operating condition of the vehicle engine. That is, in many cases known heating systems are capable of providing heat to the vehicle passenger compartment when the engine is not running or is operating in a cold condition.

Such heating systems are generally considered as supplemental heat sources inasmuch as they can be operated independently of or in addition to the heating system of the vehicle engine. Generally, such known heaters consist of a combustion chamber capable of burning therein a liquid fuel for generating the necessary heat energy. These heaters usually include means for introducing combustion air and ignition means for igniting the fuel mixtures. There may also be provided a heat exchanger which surrounds the combustion chamber of such a heating system in order to heat the air which is supplied to the vehicle interior. Usually a heated air blower is provided for blowing or drawing the heated air through conduit means for delivery to the vehicle passenger compartment.

In some known heating systems, the heating units are operated by means of the engine exhaust gases. In such systems, the heating process is accomplished without utilization of a combustion chamber, but rather by utilizing the vehicle exhaust pipe as a heat source in place of a combustion chamber. A heat exchanger may be provided through which the air to be heated flows in heat exchange relationshiop with a portion of the engine exhaust pipe.

Although systems such as those previously mentioned may provide many advantages, it will be seen that several disadvantages nevertheless arise. In a system where a separate combustion source must be provided, there is required provision of a liquid fuel, such as gasoline or diesel oil, in addition to the fuel which must be provided for engine operation. Furthermore, such a heating system must provide a separate exhaust system of its own.

In heating systems operated by the exhaust gases of the vehicle, disadvantages arise due to the requirement of expensive safety measures. In such systems, there must be provided assurance that no exhaust gases will reach the air heating system and, consequently, the interior of the vehicle.

In heating technologies normally involving applications other than vehicles, for example, home or living space heating applications, there is known the principle of utilizing heat storage means wherein stored heat may be conserved for utilization when desired. Such heating systems may employ a heat storage medium such as transformer oil or ceramic compounds which are heated preferably by means of electrical energy with the stored heat being tapped as needed by means of a blower or other similar device. It is known that liquids, such as transformer oil, are capable of storing heat.

Furthermore, in nuclear energy plants, for example, liquid sodium is used as a heat transfer medium. It has been found that certain principles and knowledge which normally find application in living space heating technology and which involve use of heat storage devices, may be developed to provide a heating system for a vehicle having an internal combustion engine.

The present invention is directed toward adapting such principles to use in vehicle heating applications. By means of the present invention, a heating system for a vehicle having an internal combustion engine may be developed which functions by utilization of a heat storage principle deriving heat energy by utilizing the vehicle exhaust gases as a heat source. With the present invention, certain advantages of known heating technologies may be provide in vehicle heating applications while avoiding many of the disadvantages of known vehicle heating systems.

SUMMARY OF THE INVENTION

Briefly, the present invention may be described as a system for heating the interior of a vehicle having an internal combustion engine including exhaust gas means, said system comprising heat reservoir means adapted to store heat energy therein, heat absorption means for enabling absorption of heat energy from said exhaust gas means of said engine by said heat reservoir means, means for supplying air to the interior of said vehicle, and means for controlling heat emission from the reservoir means, said heat emission controlling means including means for selectively enabling emission of heat energy stored in said reservoir means to air supplied to the interior of said vehicle by said air supplying means.

The heat emission controlling means may comprise insulating means, such as a vacuum chamber formed about the reservoir means, to produce a heat insulating effect obstructing transfer of the heat energy stored in the reservoir means. Heat transfer means for selectively overcoming the heat insulating effects of the vacuum chamber while enabling selective transfer of stored heat energy from the reservoir means may comprise a source of a fluid heat transfer medium which may be selectively introduced into the vacuum chamber to enable selective heating of the heating air by means of the heat stored in the reservoir means.

The exhaust pipe of the engine may be utilized as a heat source and the heat absorption means may comprise a heat exchange pipe involving liquid sodium as the heat transfer medium. In view of the fact that sodium will evaporate only when a sufficiently high temperature is reached, heat transfer between the reservoir means and the exhaust gases may be limited to a certain predetermined minimum exhaust gas temperature. Furthermore, while utilizing a liquid transfer medium such as freon, the reservoir means may be maintained within a vacuum chamber to prevent escape of the stored heat therefrom, with selective introduction of the gaseous freon into the vacuum chamber operating to heat the air introduced into the vehicle passenger compartment when desired.

Thus, in accordance with the present invention there may be accomplished utilization of a heat reservoir as a heat source for a vehicle heating system which receives heat energy from the exhaust gases of the internal combustion engine. It has been shown that a heating system of this type can be provided with a relatively simple design while offering maximum safety and sufficient heat capacity for warming the vehicle interior at minimal operating cost. Transfer of heat from the exhaust gases to the heat reservoir may be accomplished with minimal losses. In order to effect transfer of the heat from the exhaust gases to the heat reservoir, a heat pipe of known construction may be used which may be substantially fully enclosed and insulated and then evacuated and filled with a certain quantity of a liquid heat transfer medium. The inner surface of such a device may be provided with a capillary structure and its heat condition in operation may prove to be approximately 10,000 times better than that of copper.

It has been found expedient to utilize heat absorption means between the heat reservoir and the exhaust pipe which limit the occurrence of heat transfer to exhaust gas temperatures of a predetermined minimum value. In a preferred embodiment of the invention, this predetermined minimum is selected to be about 650° C. This may be accomplished, by way of example, by utilizing a liquid sodium heat transfer medium in the heat absorption means. As a result, when the exhaust gases are at a temperature level above the predetermined minimum, heat absorption by the reservoir means occurs. Heat stored in the reservoir means will be retained when exhaust gas temperatures drop below the predetermined minimum thereby enabling the stored heat to be later utilized as a source of heat energy for the heater air.

In order to maintain optimum heat storage capacity in the reservoir means, particularly in cases where longer storage periods are required, it has been shown to be expedient, in accordance with a further preferred embodiment of the invention, to arrange the heat reservoir so that it is enclosed by a heat transfer jacket which establishes an evacuated chamber between the jacket and the reservoir means. The evacuated chamber, which provides a vacuum space surrounding the reservoir means, operates to provide a heat insulating effect.

The heat reservoir means may comprise a tank or container filled with a eutectic mixture of fluorides of alkali and earth alkali metals which operate to absorb and store heat. The heat absorption means comprising the liquid sodium transfer medium may be configured in the form of a heat pipe extending between the exhaust gas conduit and the reservoir means with the heat-emitting end of such heat pipe protruding into the reservoir means. The filling of the heat pipe, in accordance with the present invention, with a substance of high thermal capacity and of a high specific heat of fusion will enable a particularly large amount of heat to be stored.

It is preferred to provide a heat reservoir having a thermal capacity such that a sufficient amount of heat energy may be stored to heat a passenger compartment or an internal combustion engine for a sufficient time at least until the engine has sufficiently warmed to be, itself, a source of heat. This heat storage capacity should be preferably in the order of approximately 1000 kcl.

Inasmuch as the reservoir means is surrounded by a vacuum insulation chamber, means must be provided to effect heat transfer to the heating air when desired. It has been found to be particularly advantageous to provide such heat transfer by means of an evaporation chamber which contains an evaporable liquid adapted to be brought into the evacuated space of the insulating vacuum chamber to establish a heat transfer path when it is desired to tap the heat energy of the reservoir means. The evaporation chamber may be provided with an electrical heating element which may heat the liquid, which may preferably be freon, thereby causing evaporation of the liquid medium whereby a heat-conducting vapor may be caused to flow through the insulating vacuum chamber to enable heat from the reservoir means to be transmitted to the heating air. By establishing a flow connection between the insulating vacuum chamber arranged around the heat reservoir tank and the evaporation chamber containing the evaporable heat transmitting liquid medium it is possible to render the insulating vacuum spacing selective heat-conducting. When heat conductivity is desired the heat transfer medium may be caused to flow into the insulating vacuum space by applying heat to evaporate the liquid. However, when no heat transfer is desired, as when the heat stored in the reservoir means is to be retained therein, the heat transfer medium may be removed from the vacuum insulating space by condensation of the heat transfer fluid. Inasmuch as the evaporable heat transfer fluid is heated by means of an electrical heating element arranged adjacent the evaporation chamber containing the heat transfer fluid, selective energization of this electrical heating element may provide selective heat transfer from the reservoir means. By selectively flowing the heat transfer fluid to within the insulating vacuum chamber, heat may be transferred to the medium which is to be heated, such as air or water, and the heat may thus be supplied to the interior of the vehicle.

In this connection, it has been proven to be particularly advantageous for the evaporation chamber to be filled, at least in part, with freon inasmuch as freon is a particularly suitable evaporable fluid.

If the system of the present invention is to be operated as a heating unit for the vehicle passenger compartment, an air blower may be provided to conduct air past the heat reservoir means and through appropriate conduits into the passenger compartment.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
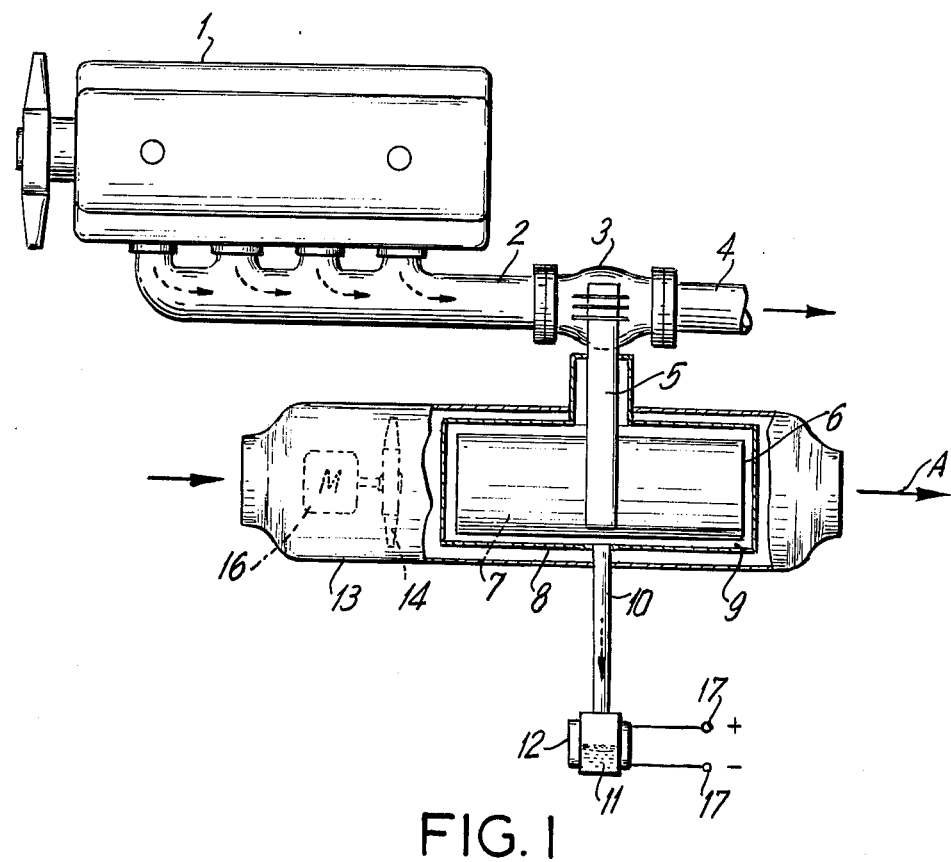
FIG. 1 is a schematic diagram illustrating the various components of a heat storage heating system in accordance with the present invention.

Referring now to the illustration of FIG. 1, an internal combustion engine 1 is structured to include exhaust gas means comprising an exhaust manifold 2 and an exhaust pipe 4 with an adapter 3 being provided therein.

The heating system of the present invention comprises as its major component heat reservoir means 6 which are adaptable to have absorbed and stored therein heat energy from the exhaust gas means of the engine 1.

Connected to extend between the adapter 3 of the exhaust gas means and the heat reservoir 6 there is provided heat absorption means in the form of a heat pipe 5 one end of which protrudes into the adapter 3 and the other end of which is in heat conducting relationship with the heat reservoir 6. Thus, heat of the exhaust gases passing through the manifold 2 and exhaust pipe 3 of the engine exhaust gas means may be absorbed into the heat reservoir 6 through the absorption means 5 extending to the adapter 3.

The heat reservoir 6 is formed with a heat transfer jacket 8 disposed thereabout with the jacket 8 being welded tight on all sides. The jacket 8 is spaced from the reservoir 6 and defines therebetween a chamber 9. The chamber 9 may be evacuated and the vacuum thus formed may operate to produce a heat insulating effect about the reservoir 6. Thus, heat energy delivered or absorbed into the reservoir 6 from the engine exhaust gases will be retained and heat losses will be obstructed by means of the vacuum formed in the chamber 9.

When the heating system of the invention is to be used to heat the interior of the vehicle by delivery thereto of heated air, the heating system may be formed as depicted in FIG. 1 to include an outer heater jacket 13 which may operate as a conduit for air passing in the direction of the arrows from left to right in FIG. 1. The heater air may be pumped by an air blower 14 driven by a motor 16. Accordingly, it will be seen that operation of the blower 14 will cause heater air to flow around the jacket 8 which surrounds the reservoir 6 and outwardly of the outer jacket 13 in the direction of the arrow A whereupon it may be delivered, through suitable conduit means (not shown) to the vehicle interior.

When it is desired to transfer heat from the reservoir 6 to the heater air flowing about the outer jacket 8, a suitable heat transfer medium is introduced into the chamber 9 thereby to overcome the insulating effects of the vacuum formed therein.

For this purpose there is provided an evaporation chamber 11 having contained therein a suitable heat transfer medium such as an evaporable fluid. A heating element 12 may be operated to selectively evaporate the heat transfer fluid contained in the evaporation chamber 11 thereby causing the fluid to flow into the vacuum chamber 9 to thereby overcome its insulating effects and to provide a heat transfer medium to enable the heat energy stored in the reservoir means 6 to be transmitted to the heater air.

The evaporation chamber 11 is connected in flow communication with the vacuum chamber 9 by a suitable conduit 10. The electrical heating element 12 is provided with a pair of terminals 17 through which the element 12 may be selectively energized to selectively cause evaporation of the heat transfer fluid within the evaporation chamber 11.

Accordingly, it will be seen that heat emission from the heat reservoir 6 may be selectively controlled by injecting and withdrawing the fluid heat transfer medium to and from the vacuum chamber 9. When no heat transfer is desired, and when it is desired to maintain the heat stored in the reservoir 6 from being emitted therefrom, the vacuum chamber 9 may be emptied of the fluid heat transfer medium by allowing the fluid to condense and to flow into the evaporation chamber 11. However, when heat emission from the reservoir 6 is desired, heating of the evaporation chamber 11 and of the fluid heat transfer medium stored therein will cause the fluid medium to evaporate and to flow into the vacuum chamber 9 thereby enabling heat emission from the reservoir 6 to the surrounding heater air. Thus, selective operation of the heat emission control means will enable selective emission of the heat from the reservoir 6.

The heat absorption means comprising the heat pipe 5 may be designed in a known manner. The heat pipe 5 is evacuated and comprises an inner surface which has a capillary structure and which is filled, for the above described application, with a small amount of sodium which will evaporate when heated thereby to effect a heat transfer operation virtually without loss.

The heat reservoir 6 is preferably filled with a material having high thermal capacity characteristics and a high specific heat of fusion. This material, designated 7 in FIG. 1, may preferably comprise a eutectic mixture of $NaF.CaF_2/MgF_2$.

The evaporation chamber 11 is, preferably, partially filled with freon which may comprise the fluid heat transfer medium of the invention.

Figure 2:
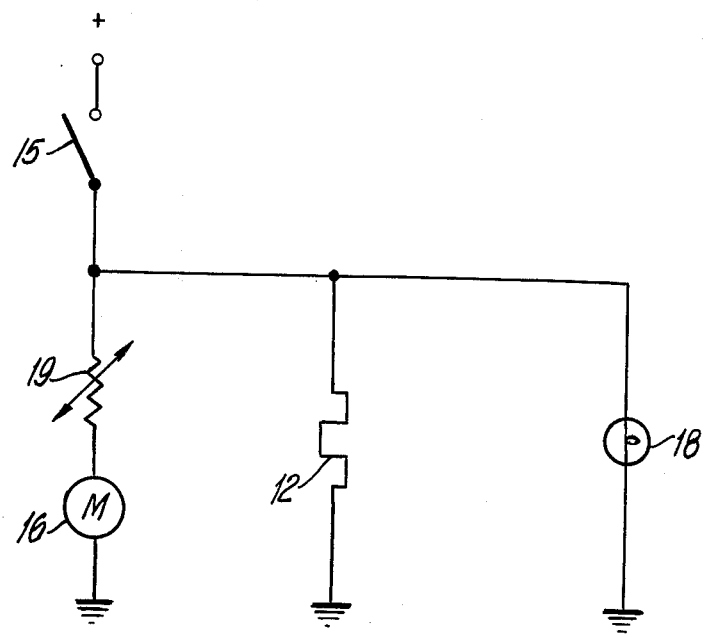
FIG. 2 is a wiring diagram pertaining to the system illustrated in FIG. 1.

FIG. 2 depicts a simplified electrical wiring diagram for the heating device of the invention. A switch 15 may be provided to activate the blower motor 16 and the heating element 12 through its terminals 17. A control light 18 may be provided to indicate energization of the system. For temperature control, there may be connected in series with the line to the blower motor 16, an NTC resistor 19 which is arranged within the hot air flow path of the heating system to sense the temperature of air pumped by the blower 14 thereby to control the speed of the blower motor 16 so that the temperature of air at the outlet A of the heating system may be maintained practically constant.

During the operation of the system of the present invention, when the internal combustion engine 1 is running, there will flow in the exhaust manifold 2 exhaust gases having a temperature of approximately 800° C. When a temperature of about 650° C. is attained in the adapter 3 and hence at the heat-conducting end of the heat pipe 5, the evaporation of the sodium in the heat pipe 5 will commence. The liquid vapor thus produced will transfer the heat of the exhaust gases to the heat storage metal 7 of the heat reservoir 6 with a conductivity level which is approximately 10,000 times that of copper.

The heat thus stored in the heat storage metal 7 of the heat reservoir 6 is protected from leakage and dissipation by the insulating vacuum produced in the vacuum chamber 9. It is only when, due to operation of the electrical heating element 12, the evaporating liquid in the chamber 11 fills the vacuum chamber 9 in gaseous form, thereby establishing a heat flow path, that heat is transferred to the heat contact jacket 8 and thus to the heating air pumped by the blower 14.

By selection of the proper heat transfer medium for the heat absorption means 5, heat transfer between the exhaust gas means of the engine 1 and the reservoir 6 may be restricted to temperature levels of the exhaust gas above a predetermined minimum level. The utilization of sodium provides a minimum heat transfer level of approximately 650° C. due to the fact that the sodium will not produce a heat transfer effect when the exhaust gas temperature is below 650° C. Thus, after the engine 1 has been operated for approximately ten minutes, and assuming that the entire system has been shut down and is in a cold condition, the heat reservoir will commence storing heat when the exhaust gas temperature reaches approximately 650° C. The heat reservoir 6 will store the maximum amount of heat at approximately 750° C–800° C after which it will effectively cease absorbing additional heat energy. If the internal combustion engine is now shut down, some heat will flow back through the heat pipe 5 into the adapter 3 from the reservoir 6. However, this flow-back process will continue only until the heat pipe has reached a temperature of approximately 650° C., below which it no longer is heat-conducting. After this minimum temperature has been reached, heat can be transferred from the reservoir 6 only by heat conduction through the thin sections of the heat pipe jacket itself. This heat conduction is relatively small and thus the major portion of the heat energy stored in the reservoir 6 will be maintained for approximately 10 to 20 hours. This heat storage effect is enhanced by the insulating effects created by the vacuum chamber 9 which, essentially, operates in a fashion similar to a conventional Thermos bottle. Thus, when the heating system is turned on, i.e. by energization of the blower 14 and of the heating element 12, the stored heat may be drawn from the reservoir 6 and conducted to the heating air flowing about the jacket 8 in order to provide heating of the vehicle passenger compartment.

Of course, it will be understood that the present invention may be utilized in applications other than as a system for heating air. For example, other applications wherein a liquid medium is to be heated could conceivably be devised within the knowledge of those skilled in the art.

While a specific embodiment of the invention has been shown and described in detail to illustrate the application of the inventive principles, it will be understood that the invention may be embodied otherwise without departing from such principles.

What is claimed is:

1. A heating system particularly suitable for heating the interior of a vehicle having an internal combustion engine including exhaust gas means, said system comprising heat reservoir means adapted to store heat energy, heat absorption means for enabling absorption of heat energy by said heat reservoir means from said engine exhaust gas means, means for supplying air to the interior of said vehicle, and means for controlling heat emission from said reservoir means, said heat emission controlling means selectively enabling emission of heat energy stored in said reservoir means to air supplied to the interior of said vehicle by said air supplying means, said heat emission controlling means comprising insulating means producing a heat insulating effect obstructing emission of the heat energy stored in said reservoir means, and heat transfer means for selectively overcoming said heat insulating effects of said insulating means to enable emission of stored heat energy from said reservoir means.

2. A system according to claim 1 wherein said insulating means comprise means forming a vacuum chamber about said heat reservoir means.

3. A system according to claim 2 wherein said heat transfer means comprise means for selectively introducing a fluid heat transfer medium into said vacuum chamber.

4. A system according to claim 1 wherein said heat absorption means comprise heat transfer restricting means enabling transfer of heat energy above negligible levels between said exhaust gas means and said reservoir means only when the temperature of said exhaust gas means is above a predetermined temperature level.

5. A system according to claim 4 wherein said predetermined temperature level is about 650° C.

6. A system according to claim 1 wherein said exhaust gas means include an exhaust gas conduit for emitting exhaust gases from said internal combustion engine, and wherein said heat absorption means comprise a heat pipe acted upon by said exhaust gas means, said heat pipe being disposed between said exhaust gas conduit and said heat reservoir means.

7. A system according to claim 2 wherein said heat emission controlling means comprise a heat transfer jacket surrounding said heat reservoir means and spaced therefrom to define therebetween said vacuum chamber.

8. A system according to claim 1 wherein said heat reservoir means comprise tank means filled with a eutectic mixture of fluorides of alkali and earth alkali metals.

9. A system according to claim 1 wherein said heat transfer means comprise an evaporation chamber having stored therein an evaporable heat transfer liquid, and electrical heating means for heating said liquid to effect evaporation thereof and to effect flow of said evaporated liquid into heat transfer relationship between said reservoir means and said supplied air.

10. A system according to claim 3 wherein said means for selectively introducing a fluid heat transfer medium into said vacuum chamber comprise an evaporation chamber having said heat transfer medium stored therein in liquid form, conduit means communicating said evaporation chamber with said vacuum chamber, and electrical heating means to heat said liquid heat transfer medium within said evaporation chamber to effect evaporation thereof and to effect flow of said evaporation liquid into said vacuum chamber.

11. A system according to claim 3 wherein said heat transfer medium is freon.

12. A system according to claim 10 wherein said heat transfer medium is freon and wherein said evaporation chamber is at least partially filled with said freon.

13. A system according to claim 1 wherein said air supplying means comprise conduit means having said reservoir means located therein and blower means located to blow air past said reservoir means to said vehicle interior through said conduit means.

14. A system according to claim 1 wherein said heat absorption means comprise sodium adapted to operate as a heat transfer medium between said exhaust gas means and said heat reservoir means.

15. A heating system for transmitting heat energy to a fluid to be heated comprising a heat source operating within a given temperature range, heat reservoir means adapted to store therein heat energy, heat absorption means effecting heat transfer between said heat source and said heat reservoir when said heat source is above a predetermined temperature within said given temperature range and preventing heat transfer therebetween when said heat source is below said predetermined temperature, means defining an insulating vacuum chamber about said heat reservoir means, means for providing a fluid heat transfer medium adapted to be introduced into said vacuum chamber, control means for selectively enabling introduction and withdrawal of said fluid heat transfer medium to and from said vacuum chamber, and means for flowing said fluid to be heated in heat transfer relationship with said heat reservoir means when said fluid heat transfer medium is introduced into said vacuum chamber to enable transfer of heat energy from said reservoir means to said fluid to be heated through said fluid heat transfer medium.

* * * * *